UNITED STATES PATENT OFFICE.

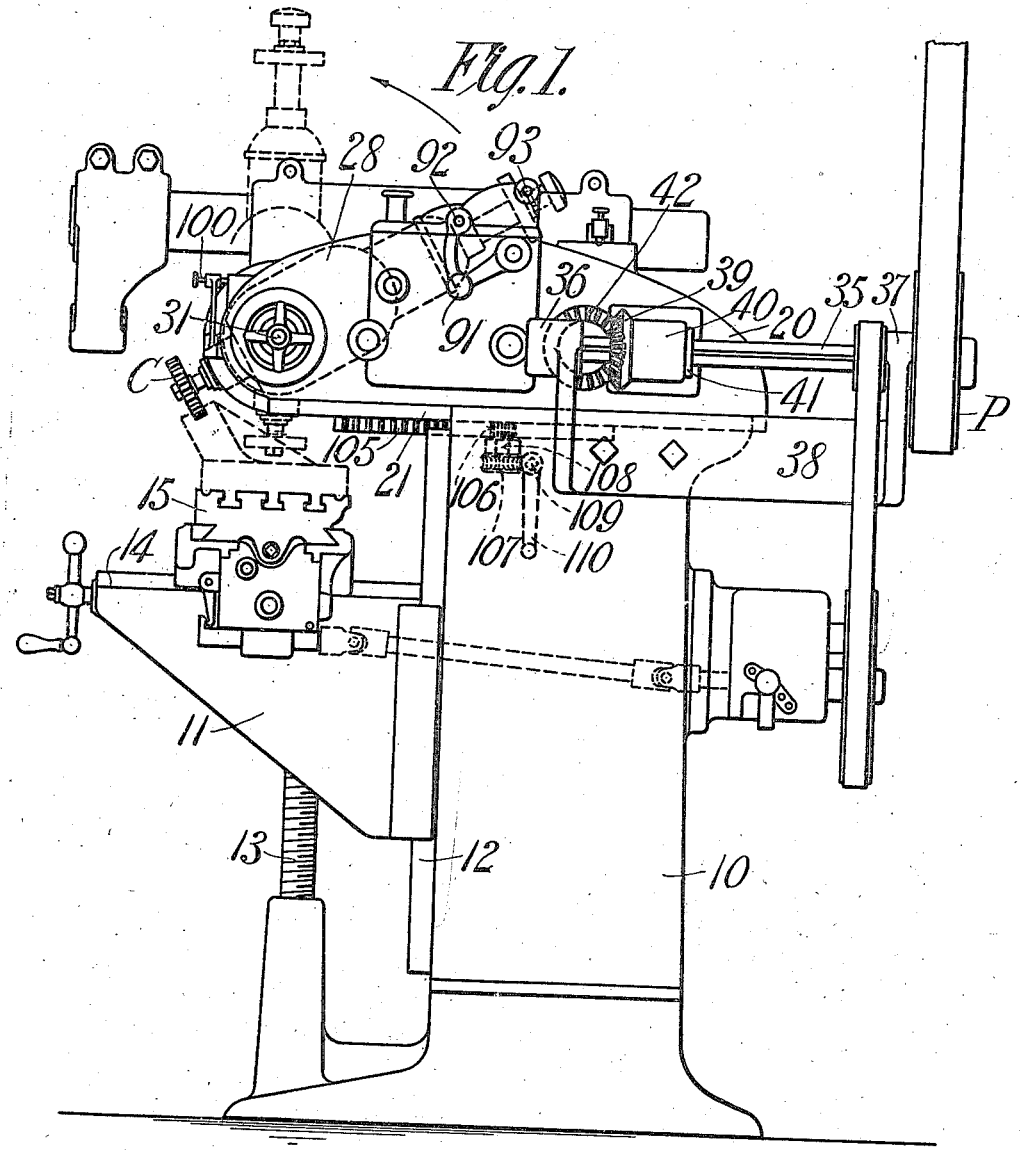

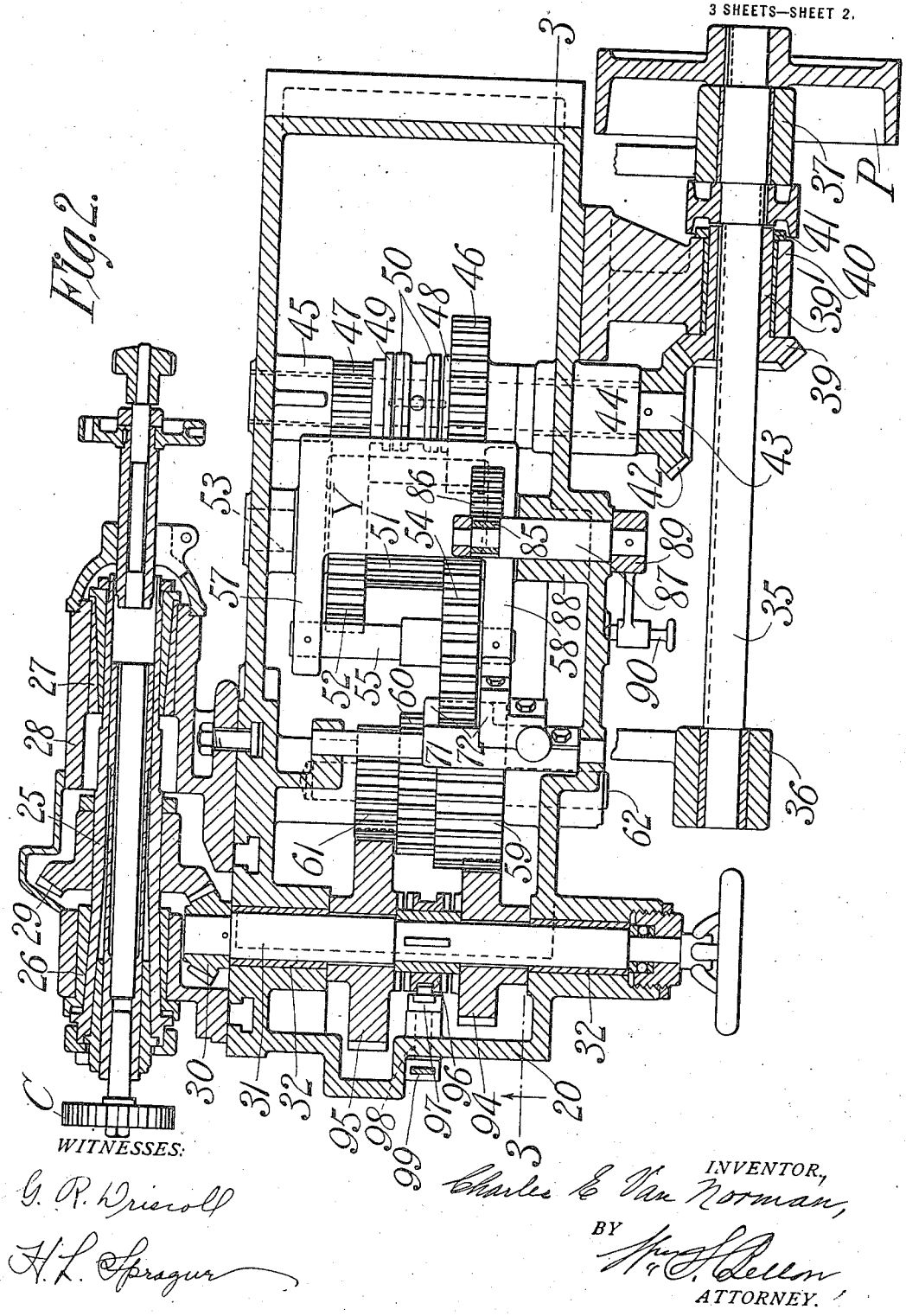

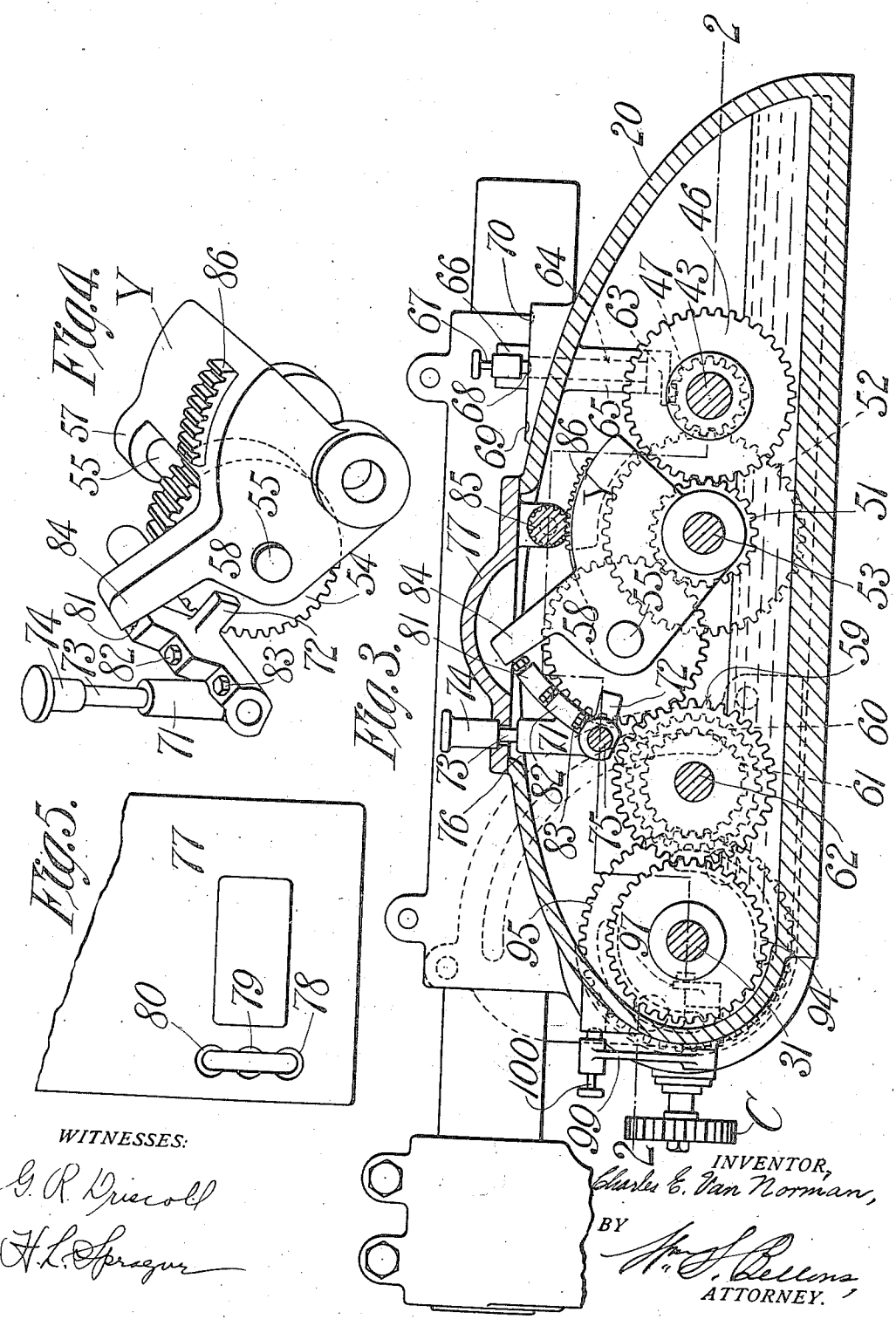

CHARLES E. VAN NORMAN, OF SPRINGFIELD, MASSACHUSETTS, ASSIGNOR, BY MESNE ASSIGNMENTS, TO VAN NORMAN MACHINE TOOL COMPANY, OF SPRINGFIELD, MASSACHUSETTS, A CORPORATION OF MASSACHUSETTS.

MILLING-MACHINE.

1,229,352.   Specification of Letters Patent.   Patented June 12, 1917.

Application filed January 22, 1910. Serial No. 539,463.

*To all whom it may concern:*

Be it known that I, CHARLES E. VAN NORMAN, a citizen of the United States of America, and resident of Springfield, in the county of Hampden and State of Massachusetts, have invented certain new and useful Improvements in Milling-Machines, of which the following is a full, clear, and exact description.

This invention relates to milling machines and has for its object the provision of certain improvements in the change-speed gear for adapting the machine to be adjusted, so as to rotate the milling cutter at a great variety of different speeds, with a minimum number of parts.

The invention has, furthermore, for its object the provision of a casing within which the change-speed gears are disposed and which is what may be considered dirt proof and serves at the same time as a lubricant-containing chamber, so that all unnecessary wear due to absence of these safeguards may be avoided.

Further objects of the invention will hereinafter appear and the means for their attainment be particularly pointed out in the claims.

The invention has been illustrated in the accompanying drawings in which similar characters denote similar parts, and in which—

Figure 1 is a side view of a milling machine embodying my improvements.

Fig. 2 is a horizontal section of the change-speed-containing case and also the tool-spindle which latter is shown horizontally disposed rather than angular as shown in Fig. 1.

Fig. 3 is a vertical longitudinal section of the gear casing.

The lines 2—2 on Fig. 3, and 3—3, on Fig. 2 indicate the planes on which the said sectional views, Figs. 2 and 3 are respectively taken.

Fig. 4 represents a perspective view of a part of the speed-changing mechanism, and Fig. 5 is a top view of the cover for said casing.

This invention is comprised in a milling machine in which a head or "ram" is mounted on a base or column for movement horizontally adjustably on a line at right angles to the longitudinal movement of the work carrier or table which is associated with the base, and which adjustable head carries externally thereof a holder for a tool carrying spindle which is revolubly adjustable on a horizontal axis transversely of the head and on a plane parallel with the line of movement of the head,—such milling machine, furthermore, embodying change speed mechanism, carried in the head, in driving connection with the spindle and means for driving the change speed mechanism irrespective of whatever position the head containing the latter may have, and which primarily includes a driving shaft non-affected as to its driving capabilities by reason of any movements of the head. In the present instance, the milling machine comprises a base 10 on which is movably supported a knee 11 which is guided on ways 12 and may be adjusted by a raising screw 13. The knee has at its upper face ways 14 on which the work carrier or support (indicated in a general way by 15) may be adjusted relatively to the tool-spindle, all these elements being of well-known construction.

It is to be remembered, that the part to which the numeral 15 is directly applied, and on which the work to be operated on by the machine is directly mounted, has its movement, as imparted by a usual form of feed mechanism therefor, at right angles to the line of movement of the head 20 to be next referred to.

Movably held on top of the base 10 is the head 20 constituting a casing and guided by ways 21 for horizontal adjustment and containing the change-speed mechanism whereby the tool-spindle of the machine may be actuated at many different speeds as will be apparent by an inspection of Figs. 2 and 3 in which this change-speed gearing is clearly shown. Here it will be seen that the tool or cutter C is held in a quill 25 which is journaled in bearings 26, 27 of a swivel-head 28 and which also carries a bevel gear 29 in constant mesh with the bevel pinion 30 secured to a horizontally disposed shaft 31. This shaft is journaled in hardened bearing sleeves 32 provided for that purpose at the forward end of the movable head 20, and the swivel-head 28 above referred to may be adjusted to any position between a horizontal and a perpendicular around the axis of the shaft 31 so that the bevel-gear 29 and pinion 30 will maintain proper driving relationship irrespective of the position the tool-spindle may occupy.

Inasmuch as the particular manner in which the tool-spindle may be adjusted longitudinally for different kinds of work and also whereby the wear in the bearings therefor may be taken up, forms no feature of the present invention, any reference thereto in this case will be omitted.

The shaft 31 is the particular element which, through the intervention of variable-speed gearing, may be driven at a number of certain different speeds from the principal driving shaft of the machine, which shaft is indicated herein by 35 and journaled in bearings 36, 37 provided in the arms of a bracket 38 rigidly secured near the upper portion of the base 10. The shaft 35 carries the main driving pulley P to which power may be imparted from any convenient source, and it also carries a bevel gear 39, the hub 39' of which (see Fig. 2) is journaled in a bearing 40 secured to the side of the movable-head 20. In order to cause the bevel gear 39 to maintain its relation to the movable-head 20 and the bearing 40, the hub 39' carries at its outer end a collar 41 whereby said hub will be held within the bearing 40.

Power is transmitted from the main driving shaft 35 through the bevel gear 39 to a similar gear 42 which is mounted at the outer end of a shaft 43 which is journaled in bearings 44 and 45 of the movable head 10 and which carries a pair of loose speed-gears 46 and 47 provided with clutch members 48, 49, respectively, which latter are adapted to be engaged by the opposite faces of a clutch spool 50 according to which one of the two gears it is desired to actuate in conjunction with the driving shaft 43.

The loose gears 46, and 47 are in constant mesh with a pinion 51 and a gear 52, respectively, which are firmly held on a shaft 53 journaled in suitable bearings in the casing or head 20. The pinion 51 is also in engagement with a gear 54 loosely mounted on a spindle 55 the ends of which are pinned or otherwise fixed in a yoke Y comprising arms 57 and 58 which swing about shaft 53 and between which the gear 54 is adapted to be moved laterally of the head into engagement with any one of a series of change gears 59, 60 and 61, respectively, without, however, going out of mesh with the pinion 51 before mentioned.

It will be understood that the gears 59, 60 and 61 are different sized, so that hence it will be understood that the shaft 62 upon which said gears are secured will be driven at different speeds by the gear 54 in accordance with whatever gear 59, 60 or 61 the same is in engagement with. From the foregoing, it will be seen that the shaft 62 can be rotated from the shaft 43, above referred to, at six different speeds, three of which depend upon the gears 59, 60 and 61, while on the other hand, the gear 54 itself can be rotated at two different speeds by virtue of the clutch connection 50 which will bring the shaft 43 in coöperation with the spindle 53 either through the gear 46 and pinion 51, or else through the pinion 47 and the gear 52.

Means are provided for operating or shifting the clutch spool 50 from a point exteriorly of the head 20, these means consisting substantially of a roll-lever 63 (see Fig. 3) secured to the lower end of the spindle 64 which is journaled in a bearing 65 and which carries at its upper end and exteriorly of the casing an actuating arm 66, the free end of which carries a spring-actuated pin 67 adapted to enter any one of a series of three recesses 68, 69 and 70. Of these, the first one named, 68, will maintain the spool in its central or neutral position, so that its clutch teeth are free from engagement with either the pinion 47 or the gear 46, while when the arm is shifted so as to bring the pin 67 into the recess 69, the spool 50 will be brought into coaction with the pinion 47; and when the pin 67 enters the recess 70, the spool 50 will be coöperative with the clutch teeth on the gear 46.

Again referring to the yoke Y, the means whereby the gear 54 is moved laterally, consists substantially of a slide 71 comprising a pair of lugs 72 which straddle said gear 54, and said slide 71 is provided with an upward extension 73 on which a button 74 is movably supported. The slide 71 is supported on a guide shaft 75 held in suitable lugs in the head which has an opening 76 through which the several parts of a change speed gear may be inserted, and which is normally closed by a slotted cover 77 (see also Fig. 5) having a series of recesses or depressions 78, 79 and 80 into which the button 74 may seat itself to keep the slide 71 in its adjusted position, these recesses being placed so as to bring the gear 54 into proper running relationship with either one of the gears 59, 60 or 61 above referred to. Now, inasmuch as it is evident that if the spindle 55 should maintain its position permanently, as shown in Fig. 3, the gear 54 would naturally be shifted out of mesh with the remaining gears 60 and 61 by virtue of its sliding movement on said spindle 55, means are provided whereby the yoke Y may be lowered so as to bring the gear 54 into engagement with the other and smaller gears 60 and 61 and as determined in the present instance by a series of abutments 81, 82 and 83 adapted to position the yoke Y, or more particularly speaking the arm 84 thereof, so as to bring the gear 54 into proper meshing engagement with the other gears of the series.

In addition to the devices just described, means are provided whereby said yoke may be partially rotated, so as to raise said yoke to bring the gear 54 out of engagement with the smaller gear 61, so that then said gear may be shifted laterally without being stopped by either of the two gears 60 or 59 of the series. In the preferred form thereof shown, this mechanism consists substantially of a pinion 85 in engagement with circular rack teeth 86 provided on the upper surface of the yoke Y, said pinion 85 being secured to, or forming a part of, a spindle 87 journaled in a bearing 88 of the head and carrying at its outer end an actuating lever 89, the free end of which carries a spring actuated pin 90 adapted to enter any one of a series of recesses 91, 92 or 93 (see Fig. 1) so as to prevent the yoke Y from being accidentally raised by the transmission of power between the gear 54 and its coöperative gears.

While, as above stated, the device thus far described produces a variation of six different speeds between the driving shaft 35 or 43, and the gear shaft 62, yet the latter may be connected so as to drive the tool-driving shaft 31 at two different speeds, this object being accomplished in the present instance by means of a pair of different sized gears 94 and 95 which are normally loose on the shaft 31 but may be connected therewith through a clutch spool 96 keyed on but slidable on the shaft 31, so as to connect the shaft 31 either with the smaller gear 94, or with the larger gear 95. The spool 96 may be thus shifted by a roll arm 97 secured to a spindle 98 and having at its outer end an actuating arm 99 (see Fig. 3) which may carry a spring actuated pin 100 whereby said arm may be held in position to maintain the spool either free from, or in engagement with, either one of the gears 94 or 95 above referred to, so that as a matter of fact the shaft 31 is susceptible of being driven at twelve different speeds from the first driving shaft 43.

In order to maintain the parts in lubricated condition, the casing or head 20 also serves as an oil-well or receptacle, as shown in Fig. 3, a feature which is important inasmuch as this construction is instrumental in avoiding a great deal of wear on the several gears, while at the same time, the amplitude of such lubrication will assist in reducing the amount of back lash to a minimum.

Furthermore, while any suitable device or mechanism may be employed to shift the movable head bodily relatively to the work on its support, I preferably employ that shown in Fig. 1 in which the sliding head 20 is shown as having at its underside a rack 105 in engagement with a pinion 106 which is mounted on a vertical stud 108 journaled in a frame and having at its lower end a worm-gear 107 in engagement with a worm 109 which may be rotated by any suitable means, such as for instance a crank arm 110.

As above stated, the movement of the head relative to the base will carry with it the bracket 40 in which the bevel gear 39 is journaled, the hub 39' of the gear being keyed on the main driving shaft 35 but movable thereon, as controlled by the position of the head, while said shaft 35 (being journaled in a stationary bracket 38) remains in its position, so that the pulley P can be driven from a narrow face pulley on a counter or line shaft. Attention is called at this time to the fact that while in Fig. 1, the sliding head has been moved to the left of the base almost to its extreme point of movement, Fig. 2 illustrates the head at its extreme position toward the right.

It may be here stated that this machine has the capabilities of doing either very heavy or light work by the use of but a single cutter carrying spindle, which spindle as has been clearly stated, is one located at the side of the head 20 near its end, and which is revolubly adjustable on a plane parallel with the line of movement which said head has relatively to the base, and which movement of the head is at right angles to the longitudinal line of movement of the work carrier.

The cutter spindle may be adjusted in a vertical position or in a horizontal position, (or in any oblique position between the vertical and the horizontal, as will be apparent on reference to Fig. 1.

The fact should be appreciated that in this machine the single cutter spindle is effective for light or heavy milling work irrespective of the revoluble adjustment which may be given to the cutter spindle, and there is as great rigidity in the driving connections contained in and bodily carried by the movable head 20 when the head is projected for a long overhang relatively to the work carrier as when the head is withdrawn to bring the cutter close in toward the base, as the mountings for the spindle driving connections are constant as to their relations between the spindle and the adjustable head. Here there is never any change in torsionable effect in any of the driving shafts comprised in the spindle driving change speed mechanism, as is the case in other milling machines having change speed gearing and where generally a cutter spindle and an auxiliary cutter spindle are required for satisfactorily performing light and heavy milling.

Many changes may be made in the construction and particular organization of the component elements of the change speed mechanism above described, without departing from the spirit of the invention, particularly as to the number of speed changes which may be obtained, and also the mechanism whereby such changes are effected.

And it is to be particularly understood that the invention is not to be limited to the means, comprising shaft 35, pulley P, and bevel gearing 39, 42, for driving the shaft 43 which enters the movable head, as such latter shaft may be otherwise driven.

I claim:—

1. In a milling machine, the combination, with a base or column, of a head or frame horizontally adjustably movable on the base, a work holding slide adjustably mounted on a vertical face of said column, a tool spindle holder mounted on the frame and revolubly adjustable in a plane parallel with the line of movement of the head, a tool spindle mounted in said holder, an actuating shaft located transversely of the movement of said head and in gear engagement with said spindle, a driving shaft mounted on said base, change gear mechanism interposed between the said driving and actuating shafts, and means for adjustably increasing or diminishing the distance between the face of said column and the actuating shaft and spindle and for maintaining the relative gear connections between the driving and actuating shafts.

2. In a milling machine, the combination with a vertical column or base, and of a chambered head or frame mounted horizontally thereon, a tool spindle and a holder therefor revolubly adjustably mounted on said frame, an actuating shaft supported by said frame, and gear-connected with the tool spindle, a driving shaft supported on said base transversely relatively to the actuating shaft, a driven shaft supported within said frame, gear mechanism connecting said driving shaft and said driven shaft, change gear mechanism connecting said driven shaft with said actuating shaft, means for variably adjusting the distance of said tool spindle from the vertical face of said column and for maintaining the gear connected relation between the said driven and actuating shafts, during the positioning of the tool spindle at any greater or less distance from the vertical face of said column.

3. In a milling machine, the combination with vertical column or base, of a chambered head or frame horizontally adjustably mounted on said base, a tool spindle holder revolubly adjustably supported on said frame, a driving shaft supported on said base, a driven shaft gear-connected with said driving shaft, an actuating shaft supported in said frame and gear connected with the said tool spindle, change gear mechanism connecting said driving and actuating shafts, means for adjustably varying the distance of the tool spindle from the vertical face of said column, and for maintaining the same gear connections and distance relation, between the driven and actuating shafts in any of the varied adjusted locations of tool spindle, in its distanced relation to the face of said column.

4. In a milling machine, the combination with a vertical base or column, of a chambered head or frame horizontally adjustably mounted on said base, a tool spindle, and a holder therefor carried by said frame and revolubly adjustably movable relatively thereto on a plane parallel to the line of movement of said frame, an actuating shaft supported by said frame and gear connected with the tool spindle, a driving shaft supported on said base, and driving means therefor, a driven shaft gear connected with the driving shaft, change gear mechanism connecting said driven shaft with said actuating shaft, and means for adjustably varying the distance of the driven shafts, the actuating shaft and the cutter spindle together from the vertical face of the column, and relative to the driving means.

5. In a milling machine, in combination, a base, a work holding carrier, mounted for horizontal movement on the base, a head horizontally slidably adjustable on the base for movement in a plane parallel with the plane of movement of the work carrier, a driving shaft mounted on the base, a shaft journaled in and bodily movable with the adjustable head, gearing slidably supported and connecting the two said shafts, a tool-carrying spindle having a gear wheel thereon and a holder by which the spindle is carried, revolubly adjustably mounted on the said head for movement on a plane parallel with the line of adjusting movement of said head, an actuating shaft and a gear mounted thereon, which is in constant engagement with the tool spindle gear, change-gear mechanism carried in the head and interposed between the said second named shaft and said actuating shaft, whereby the actuating shaft and the tool spindle may be driven at different speeds.

6. In a milling machine, in combination, a base, a hollow head horizontally slidably adjustable on the base, a work carrier, movable on a plane parallel with the line of movement of said head, a tool carrying spindle, and a holder, in which it is journaled, revolubly mounted on the side of the head for adjustment on a plane parallel with the line of movement of said head, an actuating shaft mounted transversely of the line of movement of the frame, and gearing connecting said actuating shaft and tool spindle, change gear mechanism mounted in and bodily movable with said head, and connecting with said actuating shaft, and means for driving the said change gearing.

7. A milling machine, comprising in combination, a base or column, a main drive shaft mounted wholly on said column, a work holding slide, and a frame adjustable to overlap the slide in various amounts, said frame having mounted thereon at the outer end a tool spindle holder, adjustable in a plane at a right angle to the plane of the slide, to hold the tool in various angular positions, shafts and gears to drive the holder from the main drive shaft, one of such gears having a slidable driven connection with the main drive shaft, the milling machine being characterized by the said elements to adjust the tool holder in two planes in combination with the said elements to drive the tool holder from the main drive shaft with minimum torsional strains.

8. A milling machine, comprising in combination, a base or column, a main drive shaft mounted wholly on said column, a work holding slide, and a frame adjustable to overhang the slide in various amounts, said frame having mounted thereon at an outer overhanging corner a tool spindle holder angularly adjustable for the work, a gear mounted at the diagonally opposite corner and connected to be driven by the main drive shaft, and a gear transmission on the frame to transmit the power from said gear to said holder under approximately constant conditions upon variations in the overhang of the frame and in the angular adjustments of the tool holder.

9. A milling machine, comprising in combination, a base or column, a main drive shaft mounted wholly on said column, a work holding slide, and a gear box having change gear transmission therein, said gear box being adjustable on the base for varying overhanging amounts with respect to the work slide, a rotatable tool holder adjustably mounted for different angular positions at the outer end of the gear box, the driving gear of said transmission being located at the inner end of the box and feathered to the main drive shaft, all for the purpose described.

Signed by me at Springfield, Mass., in presence of two subscribing witnesses.

CHARLES E. VAN NORMAN.

Witnesses:
 G. R. DRISCOLL,
 WM. S. BELLOWS.